(12) United States Patent
Svedman

(10) Patent No.: US 10,849,167 B2
(45) Date of Patent: Nov. 24, 2020

(54) EFFICIENT SIGNALING BASED ON ASSOCIATIONS OF CONFIGURATION PARAMETERS

(71) Applicant: ZTE Corporation, Guangdong (CN)

(72) Inventor: Patrick Svedman, Chevy Chase, MD (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/926,675

(22) Filed: Jul. 11, 2020

(65) Prior Publication Data

US 2020/0344815 A1 Oct. 29, 2020

Related U.S. Application Data

(63) Continuation of application No. PCT/US2019/013403, filed on Jan. 12, 2019.

(60) Provisional application No. 62/617,073, filed on Jan. 12, 2018.

(51) Int. Cl.
*H04W 74/08* (2009.01)
*H04W 76/27* (2018.01)
*H04W 56/00* (2009.01)

(52) U.S. Cl.
CPC ..... *H04W 74/0833* (2013.01); *H04W 56/001* (2013.01); *H04W 74/0891* (2013.01); *H04W 76/27* (2018.02)

(58) Field of Classification Search
None
See application file for complete search history.

(56) References Cited

U.S. PATENT DOCUMENTS

| 2014/0126498 A1* | 5/2014 | Koorapaty ............ H04W 72/00 370/329 |
| 2017/0332413 A1 | 11/2017 | Pelletier et al. |
| 2017/0347345 A1 | 11/2017 | Hu et al. |

FOREIGN PATENT DOCUMENTS

| EP | 3253170 A2 | 12/2017 |
| WO | 2017030485 A1 | 2/2017 |

OTHER PUBLICATIONS

3GPP, "Technical Specification Group Radio Access Network; NR; Physical layer procedures for control (Release 15)", 3GPP TS 38.213 V15.0.0, Dec. 2017.
International Search Report and Written Opinion dated Apr. 16, 2019 for International Application No. PCT/US2019/013403, filed on Jan. 12, 2019 (16 pages).

* cited by examiner

*Primary Examiner* — Edan Orgad
*Assistant Examiner* — Emmanuel K Maglo
(74) *Attorney, Agent, or Firm* — Perkins Coie LLP

(57) ABSTRACT

Described are methods, devices and systems for addresses efficient signalling of the association between downlink signals (e.g. SS/PBCH (synchronization signal/physical broadcast channel) blocks (SSBs) or CSI-RS (channel-state information reference signal)) and physical random access channel (PRACH) resources. In some embodiments, the "number of SSBs per PRACH resource" parameter value is associated with the number of frequency multiplexed PRACH resources and/or the number of symbols in the PRACH preamble format. Embodiments of the disclosed technology enable more flexible random access configurations and allow a wider range of network implementations.

20 Claims, 9 Drawing Sheets

EFFICIENT SIGNALING BASED ON ASSOCIATIONS OF CONFIGURATION PARAMETERS

CROSS-REFERENCE TO RELATED APPLICATION

This patent document is a continuation of and claims benefit of priority to International Patent Application No. PCT/US2019/013403, filed on Jan. 12, 2019, which claims the benefit of priority to U.S. Provisional Patent Application No. 62/617,073, filed on Jan. 12, 2018. The entire content of the aforementioned patent application is incorporated by reference as part of the disclosure of this patent document.

TECHNICAL FIELD

This document relates to systems, devices, and techniques for wireless communications.

BACKGROUND

Wireless communication technologies are moving the world toward an increasingly connected and networked society. The rapid growth of wireless communications and advances in technology have led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to support much deeper coverage and huge number of connections.

SUMMARY

This document relates to methods, systems, and devices for efficient signaling based on associations of downlink and uplink resources. Embodiments of the disclosed technology reduce the number of configuration bits needed to identify physical random access channel (PRACH) resources. This is achieved by using the association between downlink signals and other signaling parameters to identify the PRACH resources, and enables more flexible random access configurations and allows a wider range of network implementations.

In one exemplary aspect, a wireless communication method is disclosed. The method includes receiving, from a network node, at least one signaling parameter, receiving a plurality of downlink signals, generating measurements based on at least one of the plurality of downlink signals, selecting one of the plurality of downlink signals based on the measurements, identifying a set of random access resources and a set of random access preamble indexes associated with the one of the plurality of downlink signals based on the at least one signaling parameter, selecting a random access resource from the identified set of random access resources and a random access preamble index from the identified set of random access preamble indexes, and transmitting a preamble with the selected random access preamble index on the selected random access resource.

In another exemplary aspect, a wireless communication method is disclosed. The method includes transmitting, to a wireless device, a random access configuration comprising at least one signaling parameter, transmitting a plurality of downlink signals, detecting a preamble with a random access preamble index on a random access resource, and transmitting, in response to receiving the preamble, a random access response, wherein the random access resource and the random access preamble index are selected from a set of random access resources and a set of random access preamble indexes, respectively, and wherein the selection is associated with one of the plurality of downlink signals based on the at least one signaling parameter.

In yet another exemplary aspect, a wireless communication method is disclosed. The method includes receiving, from a network node, an information element indicating a first parameter and a second parameter, selecting a random access resource based on the first parameter, selecting a random access preamble index based on the second parameter, wherein a value of the second parameter does not exceed a maximum value for the second parameter based on a relationship between the first and second parameter, and transmitting a preamble with the selected random access preamble index on the selected random access resource.

In yet another exemplary aspect, a wireless communication method is disclosed. The method includes transmitting, to a wireless device, an information element indicating a first parameter and a second parameter, transmitting a plurality of downlink signals, detecting a preamble with a random access preamble index on a random access resource, and transmitting, in response to receiving the preamble, a random access response, wherein the random access resource and the random access preamble index are selected from a set of random access resources and a set of random access preamble indexes, respectively, wherein the selection is associated with one of the plurality of downlink signals based on the first parameter and the second parameter, and wherein a value of the second parameter does not exceed a maximum value for the second parameter based on a relationship between the first and second parameter.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Next generation (5G) wireless communication systems may use an advanced random access scheme, for example, to support the use of beamforming also during the random access. Such a scheme will support various base station (BS) and user equipment (UE) implementations in terms of beamforming, e.g. digital, hybrid or analog beamforming implementations as well as multi-TRP (transmission/reception point) implementations.

A part of the random access procedure is that the UE measures downlink (DL) signals, for example SS/PBCH (synchronization signal/physical broadcast channel) blocks (SSBs) and/or CSI-RS (channel-state information reference signal). The measurement results, e.g. RSRP (reference signal received power) are then used to select a subset of PRACH (physical random access channel) resources and/or a subset of PRACH preamble indices.

Figure 1:
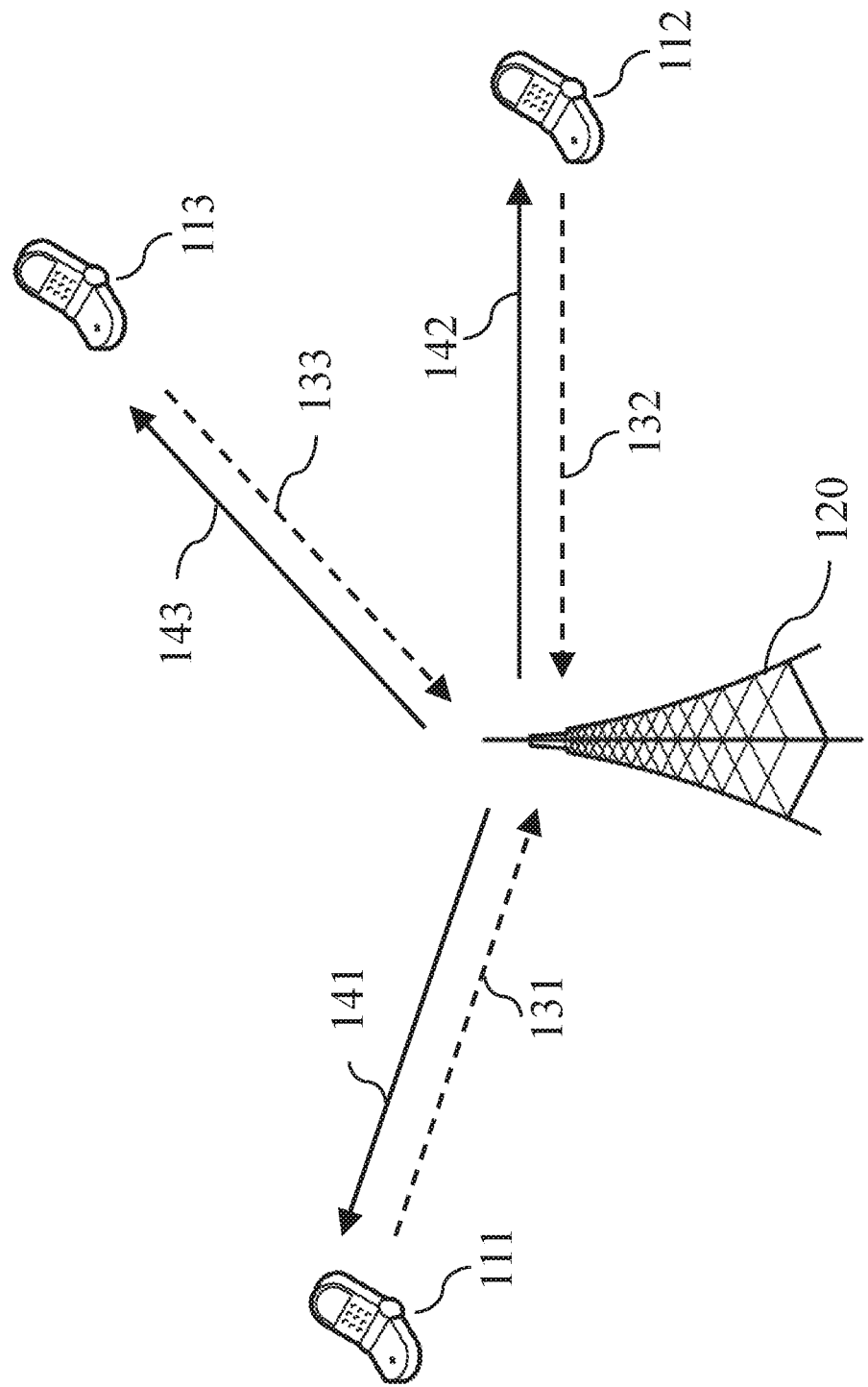
FIG. 1 shows an example of a base station (BS) and user equipment (UE) in wireless communication, in accordance with some embodiments of the presently disclosed technology.

FIG. 1 shows an example of a wireless communication system that includes a base station (BS) 120 and one or more user equipment (UE) 111, 112 and 113. In some embodiments, the base station may broadcast a random access configuration that includes a signaling parameter, and then transmit downlink signals (141, 142, 143) to the UEs. Each of the UEs receives this information and may transmit selected preamble (131, 132, 133) on a selected PRACH resource, wherein the selection is based on an association between the downlink signals and the signaling parameter.

For example, the DL signal with highest RSRP is used to select PRACH resource and/or preamble index. In some cases, it is up to the UE select which DL signal to use for selecting PRACH resource and/or preamble index. In some cases, e.g. new radio (NR), the UE may select any of the DL signals (e.g. SSBs) with a measurement result above a threshold, which may be configurable.

Some embodiments of the disclosed technology described in this patent document use SSB as an example of a downlink (DL) signal. However, these embodiments are also compatible with other sets of DL signals, such as a set of configured CSI-RS. The embodiments are also compatible with the "actually transmitted SSBs" ("present SSBs", which may be a subset of all SSBs. The subset of actually transmitted SSBs can be indicated in broadcast system information (SI) (e.g. system information block 1 (SIB1) in NR) and/or with dedicated (UE specific) signaling, e.g. RRC signaling. Actually transmitted SSBs may be configured with the parameters SSB-transmitted-SIB1, InOneGroup, groupPresence and/or SSB-transmitted, which use one or more bitmaps to indicate actually transmitted SSBs.

A PRACH resource is a time-frequency resource in which a UE can transmit a PRACH preamble according to a preamble format. In some embodiments, a PRACH preamble may consist of one or more symbols (or sequences), e.g. Zadoff-Chu sequences), e.g. OFDM (orthogonal frequency division multiplexing) symbols. NR, for example, supports both single symbol PRACH preamble formats and formats with multiple symbols (or sequences), e.g. 2, 4, 6 and 12 symbols (or sequences). Different PRACH resources may be multiplexed in frequency and/or in time. In some contexts, a PRACH resource is called RACH occasion (RO), PRACH occasion or PRACH transmission occasion.

The mechanism by which the UE selects an SSB to select a subset of PRACH resources and/or preamble indices is called association (also called mapping). In the association framework, each of the SSBs that the UE may select is associated with a subset of PRACH resources and/or a subset of preamble indices. In some embodiments, the association may be configurable by the network, for example in SI, e.g. SIB1, and/or with dedicated (UE specific) signaling, e.g. RRC signaling.

In some embodiments, a subset of PRACH resources may be a subset of a set of PRACH resources that are configured using a PRACH resource configuration. For example, such a configuration of a set of PRACH resources can be done via a PRACH configuration index (e.g. called prach-ConfigurationIndex or PRACHConfigurationIndex in the specification), as in LTE and NR.

In some embodiments, a subset of preamble indices may be a subset of the set of the indices of the PRACH preambles (preamble sequences) available in a PRACH resource. The set of indices available in a PRACH resource may be limited by various configurations such as a configuration of restricted set, e.g. restricted set type A or type B, cyclic shift configuration, e.g. zeroCorrelationZoneConfig in NR.

For an efficient configuration (e.g. few configuration bits) of the association between SSBs and subsets of PRACH resources and/or preamble indices, it can be defined by specifying a few simple association rules and a few configuration parameters. For some embodiments of NR, the following rules may be implemented for contention-based random access (CBRA):

(1) Association of one SSB to one PRACH resource is supported, e.g. different SSBs are associated with disjoint subsets of PRACH resources.

(2) Association of many SSBs to one PRACH resource is supported, e.g. different SSBs can be associated with overlapping subsets of PRACH resources.

(3) Association of one SSB to many consecutive PRACH resources, e.g. one SSB is associated to all frequency multiplexed PRACH resources in one time instance.

(4) Each SSB is associated with the same number of PRACH preamble indices, e.g. the associated preamble subsets are of equal size.

(5) The subset of preamble indices associated with an SSB are consecutive.

(6) The SSBs are consecutively mapped to subsets of PRACH resources and/or subsets of preamble indices in the order of:

(6.1) Increasing preamble index in a PRACH resource, (6.2) Increasing frequency multiplexed PRACH resource, and (6.3) Increasing time multiplexed PRACH resource (e.g. first to consecutive PRACH resources in a slot and then to PRACH resources in subsequent slots).

Frequency Multiplexing

In some embodiments, the number of frequency multiplexed PRACH resources (denoted F for brevity) is a signaling parameter that may be associated with the "number of SSBs per PRACH resource" parameter value. In some embodiments, the parameter is denoted prach-FDM, and may be configured as a 2-bit parameter.

In some embodiments, the number of frequency multiplexed PRACH resources is the same for each time instance in which PRACH resources are configured. In some embodiments, the number of frequency multiplexed PRACH resources is different in different time instances in which PRACH resources are configured.

For example if both PRACH resources for CBRA and separate PRACH resources for CFRA are configured in some time instances while only PRACH resources for CBRA or separate PRACH resources for CFRA are configured in other time instance. In some embodiments, the number of frequency multiplexed PRACH resources for CBRA is the same for each time instance in which PRACH resources for CBRA are configured in a cell.

PRACH Preamble Formats

In various embodiments, different preamble formats can be configured. In some embodiments, a preamble format corresponds to a set of parameters, for example one or more of the following:

(1) a sequence length (e.g. lengths 139 or 839),
(2) a cyclic prefix (CP) duration,
(3) the number of times the sequence is repeated within the preamble (denoted K for brevity), not counting the CP (and/or the duration of the preamble excluding the CP),
(4) a subcarrier spacing, and
(5) a bandwidth.

In various embodiments, the preamble format or a part of the preamble format is jointly indicated with a PRACH resource configuration, e.g. using a PRACH configuration index. In some embodiments, the preamble format or a part of the preamble format is configured separately from the PRACH resource configuration.

Association Configuration Parameters

Embodiments of the disclosed technology are described in the context of random access configurations for contention-based random access (CBRA). These embodiments may be applied to random access configurations for contention free random access (CFRA).

In some embodiments, the association between SSBs and subsets of PRACH resources and/or subsets of preamble indices is achieved by configuring the two parameters:

(1) The number of preambles per SSB per PRACH resource (denoted P for brevity). In some embodiments, the parameter is denoted CB-preambles-per-SSB, and may be configured as a 4-bit parameter, and
(2) The number of SSBs that are associated with a PRACH resource (denoted S for brevity). In some embodiments, the parameter is denoted SSB-per-rach-occasion, and may be configured as a 3-bit parameter.

Note that S can be both greater than 1 or less than 1, e.g. S=N or S=1/N where N is a positive integer such as N=2, 4, 8, in various embodiments.

For example, an S greater than 1, e.g. S=2, means that 2 different SSBs are associated with the same PRACH resource. Such a configuration is useful for example when the different SSBs associated with the same RACH resource are configured to be associated with different (e.g. disjoint) sets of preamble indices.

For example, an S less than 1, e.g. S=½, means that one SSB is associated with 2 consecutive PRACH resources. Such a configuration is useful for example when there are multiple frequency multiplexed PRACH resources in one time instance, but a single beam (corresponding to a single SSB) can be used per time instance.

Example Associations

FIGS. 2-8 illustrate various embodiments with a few different PRACH resource allocations and associations with 8 SSBs. The boxes in the figures represent PRACH resource, i.e. time-frequency resource in which a PRACH preamble can be transmitted. The text in the boxes, e.g. "SSB 0" and "SSB 1" represents that SSB 0 and SSB 1 are associated with the PRACH resource. When all SSBs have been associated with PRACH resources, the association wraps around and continues with SSB0 in the next PRACH resource.

Figure 2:
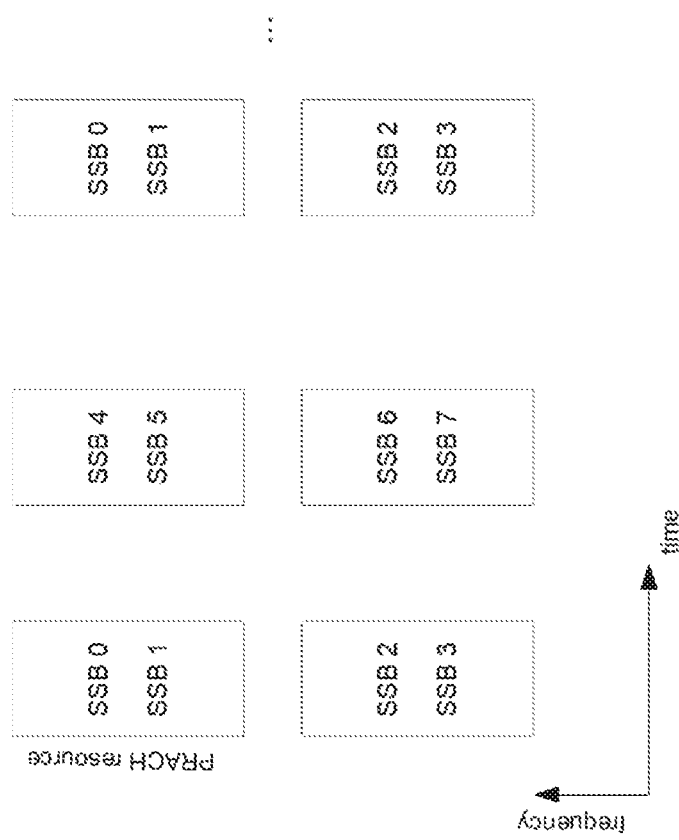
FIG. 2 shows an exemplary association of SS/PBCH (synchronization signal/physical broadcast channel) blocks (SSBs) and physical random access channel (PRACH) resources.

FIG. 2 shows an example wherein two SSBs are associated with a PRACH resource, i.e. S=2. Based on the PRACH resource configuration, the SSBs are consecutively associated with the PRACH resources. All SSBs are associated with PRACH resources in two time instances with PRACH resources.

Figure 3:
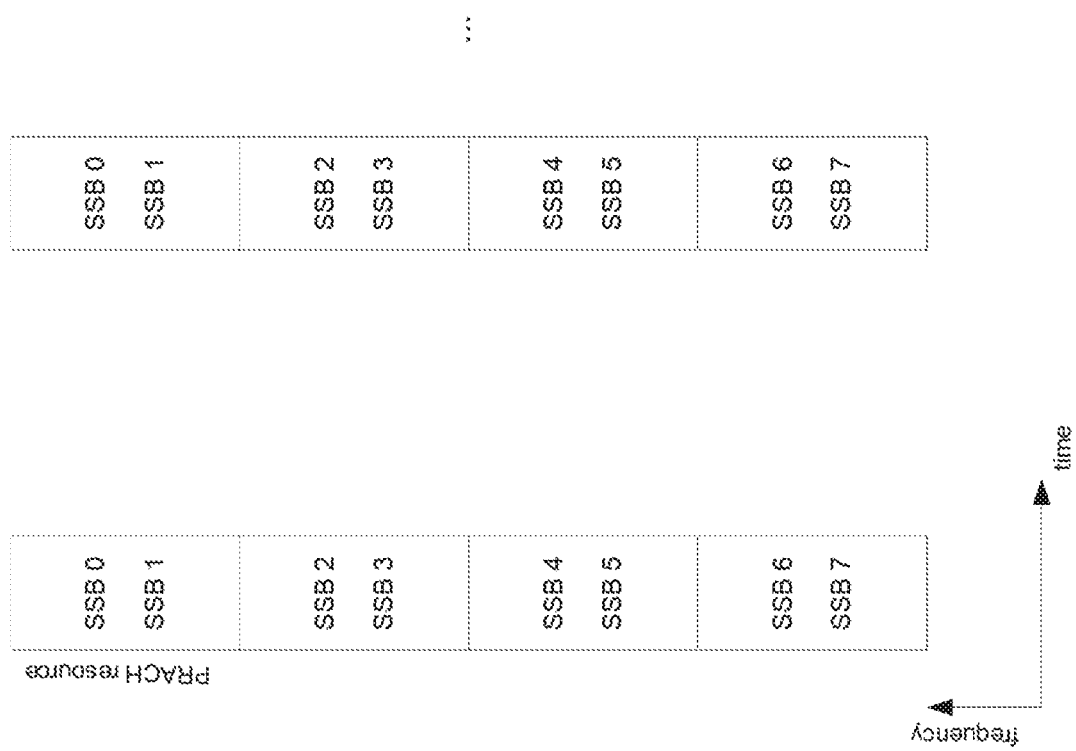
FIG. 3 shows another exemplary association of SSBs and PRACH resources.

FIG. 3 shows an example wherein two SSBs are associated with a PRACH resource, i.e. S=2. Based on the PRACH resource configuration, the SSBs are consecutively associated with the PRACH resources. All SSBs are associated with PRACH resources in one time instance with PRACH resources.

Figure 4:
FIG. 4 shows yet another exemplary association of SSBs and PRACH resources.

FIG. 4 shows an example wherein 8 SSBs are associated with a PRACH resource, i.e. S=8. Based on the PRACH resource configuration, the SSBs are consecutively associated with the PRACH resources. All SSBs are associated with PRACH resources in one time instance with PRACH resources.

Figure 5:
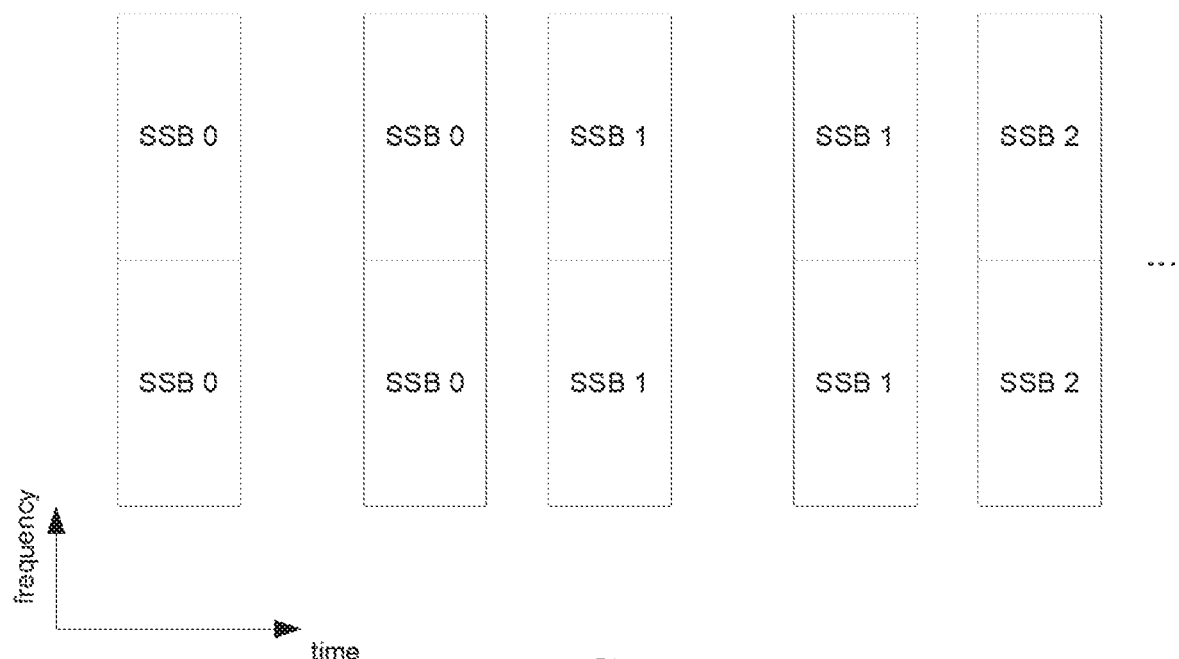
FIG. 5 shows yet another exemplary association of SSBs and PRACH resources.

FIG. 5 shows an example wherein one SSBs are associated with a PRACH resource, but each SSB is associated with two consecutive PRACH resources, i.e. S=½. Based on the PRACH resource configuration, the SSBs are consecutively associated with the PRACH resources. All SSBs are associated with PRACH resources in 8 time instances with PRACH resources.

Figure 6:
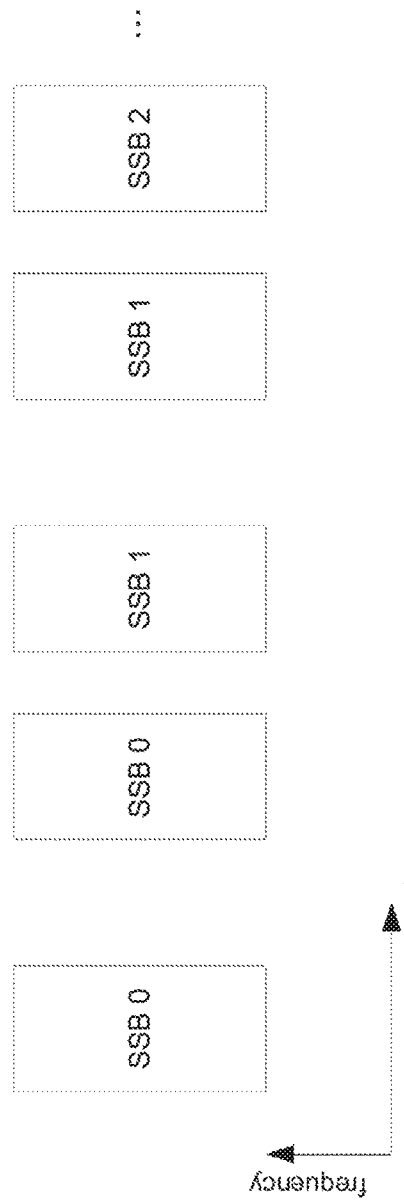
FIG. 6 shows yet another exemplary association of SSBs and PRACH resources.

FIG. 6 shows an example wherein one SSBs are associated with a PRACH resource, but each SSB is associated with two consecutive PRACH resources, i.e. S=½. Based on the PRACH resource configuration, the SSBs are consecutively associated with the PRACH resources. All SSBs are associated with PRACH resources in 16 time instances with PRACH resources.

Figure 7:
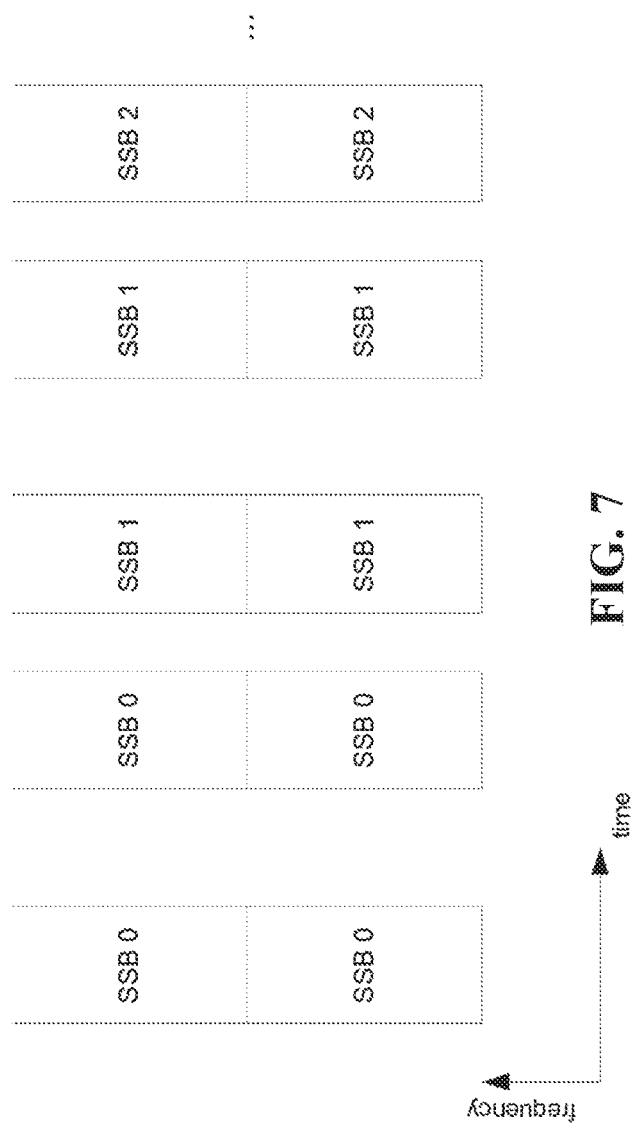
FIG. 7 shows yet another exemplary association of SSBs and PRACH resources.

FIG. 7 shows an example wherein one SSBs are associated with a PRACH resource, but each SSB is associated with four consecutive PRACH resources, i.e. S=¼. Based on the PRACH resource configuration, the SSBs are consecutively associated with the PRACH resources. All SSBs are associated with PRACH resources in 16 time instances with PRACH resources.

Figure 8:
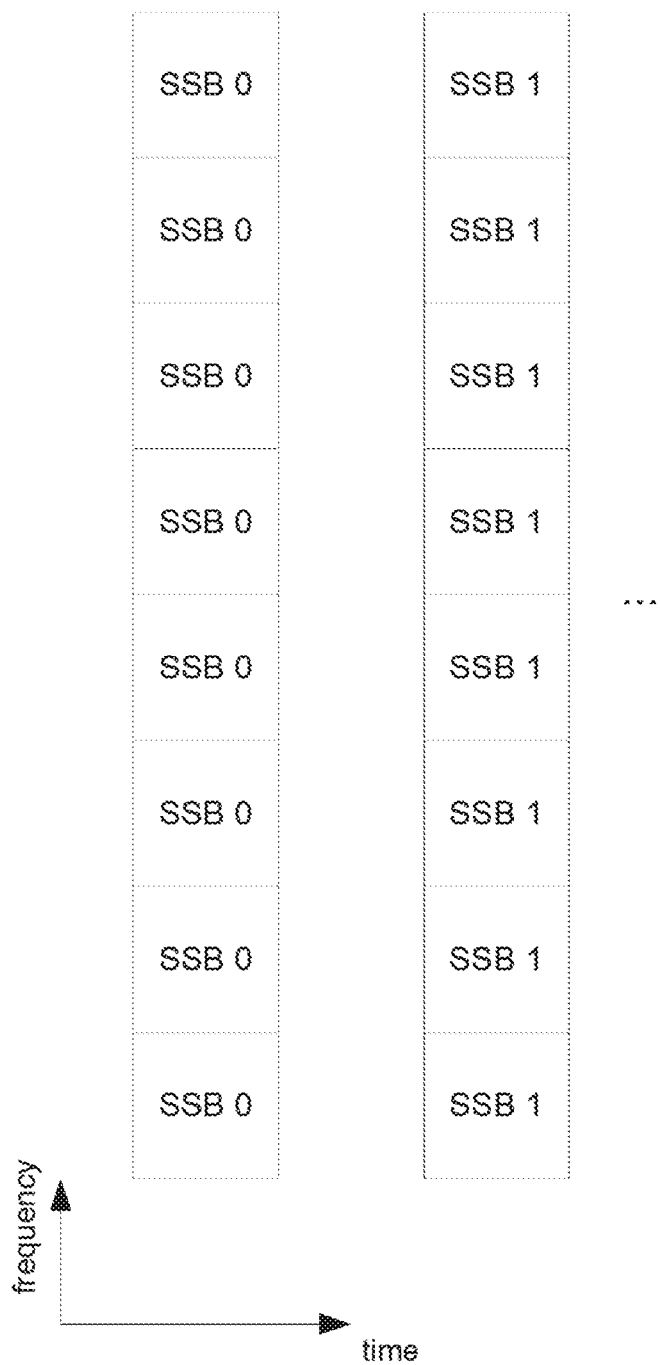
FIG. 8 shows yet another exemplary association of SSBs and PRACH resources.

FIG. 8 shows an example wherein one SSBs are associated with a PRACH resource, but each SSB is associated with 8 consecutive PRACH resources, i.e. S=⅛. Based on the PRACH resource configuration, the SSBs are consecutively associated with the PRACH resources. All SSBs are associated with PRACH resources in 1 time instances with PRACH resources.

Signaling of the Number of SSBs Per PRACH Resource (S)

Based on the examples shown in FIGS. 2-8, it is clear that it may be necessary to support a wide range of parameter values for S. In the examples, the values S={8, 2, ½, ¼, ⅛} were shown. However, depending on the maximum number of frequency multiplexed PRACH resources, the maximum number of consecutive time instances to which the same SSB is associated with all PRACH resources and the maximum number SSBs associated with the same PRACH resource, a much wider range of parameter values may be needed.

For example, in an embodiment with up to 8 frequency multiplexed PRACH resources and up to 32 SSBs associated with the same PRACH resource, it might be necessary to support the following parameter values for S: S={32, 28, 25, 24, 21, 20, 18, 16, 15, 14, 12, 10, 9, 8, 7, 6, 5, 4, 3, 2, 1, ½, ⅓, ¼, ⅕, ⅙, ⅐, ⅛}, which is 28 values (needs 5 bits).

One potential drawback when supporting a large value range for S is the reliance on the assumption that the parameter values are fixed in a specification. In some embodiments of the disclosed technology, a more efficient signalling of S is designed by exploiting that some values of S are only useful in some scenarios, in various embodiments. This may result in needing fewer bits to indicate S. Alternatively, given a certain number of bits used to indicate S, the value range can be expanded and more flexible and efficient association can be configured.

In some embodiments, the value of S is made to depend on the number of frequency multiplexed PRACH resources (F).

In some embodiments, the value of S is made to depend on the number of symbols (or sequences) in the configured PRACH preamble format (K).

In some embodiments, the value of S is made to depend on both the number of frequency multiplexed PRACH resources and the number of symbols (or sequences) in the configured PRACH preamble format.

Example Embodiments of S Depending on F

In an example, let S' denote the parameter that is signalled, in a SI (e.g. SIB1) and/or with dedicated signalling (e.g. in a handover command), in a random access configuration. In some embodiments, S' is the RRC parameter SSB-per-RACH-occasion, which is 3 bits in some embodiments. In some embodiments, the encoding and/or value range of S and/or S' are specified using ASN.1, for example using the INTEGER { } or ENUMERATED { } types, in various embodiments. For example S'=INTEGER {0..31} or S=ENUMERATED {s32, s28, . . . , s1over7, s1over8}, where s32 corresponds to 32, s1over7 corresponds to ⅐ etc.

In some embodiments, the number of values for S' is the same as the number of values for S, in some cases including some reserved values. For example, if the 28 different vales for S in the example above are needed, then the 5-bit S' could have values 0-31 with the values 0-27 each corresponding to one of the values of S={32, 28, . . . , ⅐, ⅛}. The four remaining values of S' could be reserved for future use. This is summarized in Table 1.

TABLE 1

| S' (5 bits) | 0 | 1 | ... | 27 | 28 | ... | 31 |
|---|---|---|---|---|---|---|---|
| S (28 values) | 32 | 28 | ... | ⅛ | reserved | ... | reserved |

In various embodiments, the number of SSBs associated with a PRACH resource (S) is based on both the signalled S' and the number of frequency multiplexed PRACH resources (F). Note that F is signalled separately in various embodiments. In various embodiments, the value of S can be obtained from a table, where the values of S' and F can be used to select one table entry. An embodiment is illustrated in Table with exemplary values.

TABLE 2

| S' (3 bits): | 0 | 1 | ... | 6 | 7 |
|---|---|---|---|---|---|
| F = 1 | S = 32 | S = 25 | ... | S = 2 | S = 1 |
| F = 2 | S = 28 | S = 24 | ... | S = 1 | S = ½ |
| ... | ... | ... | ... | ... | ... |
| F = 8 | S = 8 | S = 4 | ... | S = ¼ | S = ⅛ |

In various embodiments, the value range of F depends on the PRACH preamble format, for instance as configured by a PRACH configuration index. In some embodiments, the value range of F depends on one or more of the PRACH preamble bandwidth, PRACH subcarrier spacing, PRACH sequence length, PRACH configuration index. In some embodiments, the value range of F is defined in a table such that the maximum value for F ($F_{max}$) is such that $F_{max}$ frequency multiplexed PRACH resources, e.g. consecutively or non-consecutively, fit into a maximum bandwidth of an initial active uplink bandwidth part. In some embodiments, the maximum bandwidth of an initial active uplink bandwidth part depends on the carrier frequency, i.e. different frequency ranges may have different maximum bandwidths. In some embodiments, the maximum bandwidth of an initial active uplink bandwidth part is equal to or less than the minimum required UE UL transmission bandwidth, which may be different in different carrier frequency ranges.

An example embodiment is shown below, where RB=resource block, SCS=sub-carrier spacing, and prach-FDM=F.

Frequency range 1 (below 6 GHz):

Long sequence with 1.25 kHz SCS: prach-FDM = {1,2,4,8}
prach-FDM = 8 corresponds to 8.64 MHz (48 RBs in 15 kHz)
Long sequence with 5 kHz SCS: prach-FDM = {1,2,3,4}
prach-FDM = 8 corresponds to 17.28 MHz (96 RBs in 15 kHz)
Short sequence with 15 kHz SCS: prach-FDM = {1,2,4,8}
prach-FDM = 8 corresponds to 17.28 MHz (96 RBs in 15 kHz)
Short sequence with 30 kHz SCS: prach-FDM = {1,2,3,4}
prach-FDM = 4 corresponds to 17.28 MHz (96 RBs in 15 kHz)
Frequency range 2 (above 6 GHz):

Short sequence with 60 kHz SCS: prach-FDM = {1,2,4,8}
prach-FDM = 8 corresponds to 69.12 MHz (96 RBs in 60 kHz)
Short sequence with 120 kHz SCS: prach-FDM = {1,2,3,4}
prach-FDM = 4 corresponds to 69.12 MHz (96 RBs in 60 kHz)

Example Embodiments of S Depending on K

In various embodiments, the number of SSBs associated with a PRACH resource (S) is based on both the signalled S' and the number of number symbols (or sequences) in the configured PRACH preamble format (K). For example, the number of symbols can be 1, 2, 4, 6 or 12. Note that K can be signalled separately in various embodiments and as a part of PRACH configuration index on various embodiments. In various embodiments, the value of S can be obtained from a table, where the values of S' and K can be used to select one table entry. An embodiment is illustrated in Table 3 with exemplary values.

TABLE 3

| S' (3 bits): | 0 | 1 | ... | 6 | 7 |
|---|---|---|---|---|---|
| K = 1 | S = 4 | S = 2 | ... | S = ¼ | S = ⅛ |
| K = 2 | S = 8 | S = 4 | ... | S = ½ | S = ¼ |
| ... | ... | ... | ... | ... | ... |
| K = 8 | S = 32 | S = 24 | ... | S = 1 | S = ½ |

In some embodiments, S may be associated with K since it may be more useful to associate many SSB with a PRACH resource if the preamble format used in the PRACH resource has many symbols (or sequences). For example, the association of many SSBs to one PRACH resource is useful when the base station uses beamforming but doesn't support Tx/Rx beam correspondence. In such scenarios, the base station may configure a preamble format with many symbols, so that the base station can perform Rx beam sweeping during the PRACH resource. In this case, it is advantageous to configure many SSB to one PRACH resource association, and instead configure different (e.g. disjoint) sets of preambles indices for different SSBs. On the other hand, when the PRACH resource is based on a short single-symbol preamble format, the need to associate many SSBs to a PRACH resource is lower.

Example Embodiments of S Depending on F and K

In various embodiments, the number of SSBs associated with a PRACH resource (S) is based on both the signalled S', the number of frequency multiplexed PRACH resources (F) and the number of number symbols (or sequences) in the configured PRACH preamble format (K). In various embodiments, the value of S can be obtained from a table, where the values of S', F and K can be used to select one table entry. In various embodiments, the value of S can be obtained from a set of tables. In some embodiments, one of these tables corresponds to one value of F, and the values of S' and K can be used to select one table entry in one of these tables, for example as in Table 3. In some embodiments, one of these tables corresponds to one value of K, and the values of S' and F can be used to select one table entry in one of these tables, for example as in Table 2.

Embodiments with an Additional Configuration Parameter (Z)

In various embodiments, an additional parameter Z for configuring the association between SSBs and subsets of PRACH resources and/or a subsets of preamble indices is introduced. In some embodiments, the parameter Z indicates the number of consecutive PRACH resources (e.g. according to the mapping order mentioned above) over which the same association(s) and/or SSBs are repeated. This repetition could be similar or the same as when S=1/N with N being a positive integer, as described above. In various embodiments in which Z is used, the values of S are restricted to S=N. It may not be necessary to include such fractional values (e.g. 1/N) in S if a similar or same function is achieved with the separate parameter Z.

For example, the associations in FIG. 5 could be achieved by setting S=1 and Z=2, in some embodiments. Similar embodiments for the examples shown in FIGS. 2-8 may be disclosed in a similar manner.

In some embodiments, a benefit of using a separate parameter Z to indicate the repetition is that the association of multiple SSBs to a PRACH resource can be combined with repetition greater that one.

Figure 9:
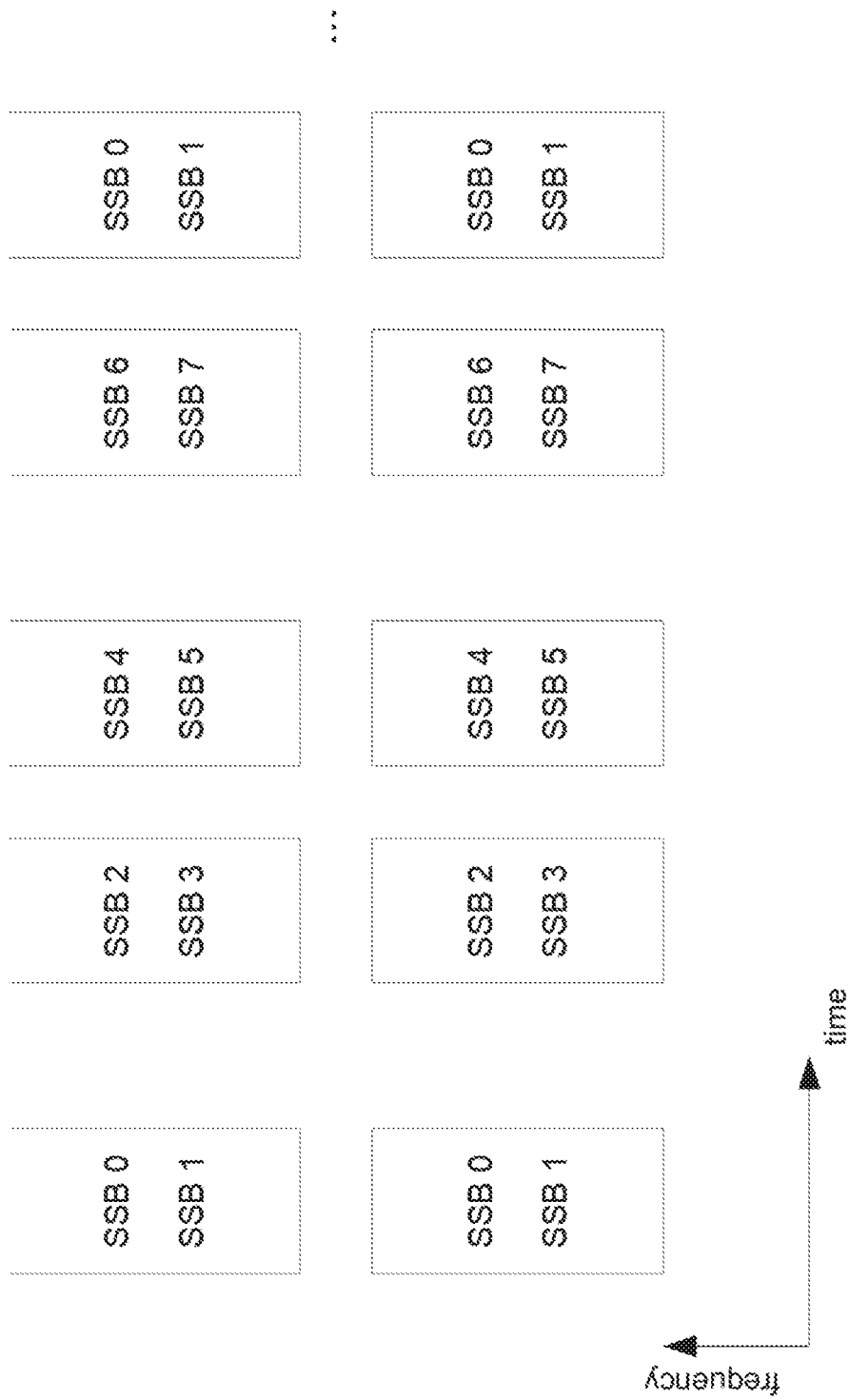
FIG. 9 shows yet another exemplary association of SSBs and PRACH resources.

FIG. 9 shows an example where two SSBs are associated with a PRACH resource, i.e. S=2, and each SSB is associated with two consecutive PRACH resources, i.e. Z=2. Based on the PRACH resource configuration, the SSBs are consecutively associated with the PRACH resources. All SSBs are associated with PRACH resources in 4 time instances with PRACH resources. As shown in FIG. 9, it may be possible to combine S=2 with Z=2. In the embodiments without Z, it may not be possible to simultaneously configure S=2 and S=½.

Embodiments with a separate S and Z allow more flexible configuration of associations. For example, BS beamforming constraints, e.g. "hybrid beamforming implementation", may limit the association of SSBs in a time instance to two SSBs. In the example of FIG. 9, only SSB 0 and SSB 1 can be received in the first time instance with PRACH resources, only SSB 2 and 3 can be received in the second time instance etc. With a single parameter S (for F=2), the typical configuration would be S=1, i.e. SSB 0 would be associated with the first frequency multiplexed PRACH resource, and SSB 1 would be associated with the second frequency multiplexed PRACH resource. With the association in FIG. 9, the PRACH preambles of one SSB are distributed among the frequency multiplexed PRACH resources, which can have the benefit och reduced received PRACH interference, e.g. since the preambles associated with a particular SSB may be received on the beam used for the SSB.

In various embodiments, the value of Z depends on the number of frequency multiplexed PRACH resources (F).

In some embodiments, Z' is the RRC parameter configuring Z, which is 1 or 2 bits in various embodiments. In some embodiments, the number of values for Z' is the same as the number of values for Z, in some cases including some reserved values. In some embodiments, Z=min(Z', F), i.e. the association can be configured to be repeated on at most F PRACH resources. In some embodiments, Z=Z'. In some embodiments, Z'={0,1,2,3} corresponds to Z={1,2,3,4} or Z={1,2,4,8}.

In some embodiments, the Z' and F parameters are mapped to Z by using a table, for example as in Table 4.

TABLE 4

|        | F = 1 | F = 2 | F = 4 | F = 8 |
|--------|-------|-------|-------|-------|
| Z' = 0 | Z = 1 | Z = 1 | Z = 1 | Z = 1 |
| Z' = 1 | Z = 1 | Z = 2 | Z = 2 | Z = 2 |
| Z' = 2 | Z = 1 | Z = 2 | Z = 4 | Z = 4 |
| Z' = 3 | Z = 1 | Z = 1 | Z = 4 | Z = 8 |

In various embodiments, SSBs that are associated with the same PRACH resource are associated with disjoint subsets of preamble indices. In various embodiments, SSBs that are associated with the same PRACH resource are associated with partly or completely overlapping subsets of preamble indices. In various embodiments, SSBs that are associated with the same PRACH resource are associated with partly or completely overlapping subsets of preamble indices.

In some embodiments, some of the entries in the table indicate that SSBs associated with the same PRACH resource (if any) are associated with disjoint preamble subsets. In some embodiments, some of the entries in the table indicate that SSBs associated with the same PRACH resource (if any) are associated with partly or completely overlapping preamble subsets. In some embodiments, the entries indicating overlapping subsets further indicate that W SSBs (associated with the same PRACH resource) are associated with (partly or completely) overlapping preamble subsets. In some embodiments, W is equal to S. In some embodiments, different entries in the table correspond to different W. For instance, different values of Z' correspond to W=S, W=floor(S/2), W=floor(S/4), or W=S, W=ceil(S/2), W=ceil(S/4), where floor( ) and ceil( ) round down and up, respectively. Various embodiments of the disclosed technology in the context of this framework are shown, with exemplary values (e.g. the value range of F), in Table 5 and Table 6.

TABLE 5

|   | F = 1 | F = 2 | F = 4 | F = 8 |
|---|-------|-------|-------|-------|
| Z' = 0 | Z = 1 (disjoint) | Z = 1 (disjoint) | Z = 1 (disjoint) | Z = 1 (disjoint) |
| Z' = 1 | Z = 1, W = S | Z = 2 (disjoint) | Z = 2 (disjoint) | Z = 2 (disjoint) |
| Z' = 2 | Z = 1, W = floor(S/2) | Z = 2, W = S | Z = 4 (disjoint) | Z = 4 (disjoint) |

TABLE 5-continued

| F = 1 | F = 2 | F = 4 | F = 8 |
|---|---|---|---|
| Z' = 3 Z = 1, W = floor(S/4) | Z = 1, W = S | Z = 4, W = S | Z = 8 (disjoint) |

TABLE 6

| F = 1 | F = 2 | F = 4 | F = 8 |
|---|---|---|---|
| Z' = 0 Z = 1 (disjoint) | Z = 1 (disjoint) | Z = 1 (disjoint) | Z = 1 (disjoint) |
| Z' = 1 Z = 1, W = S | Z = 2 (disjoint) | Z = 2 (disjoint) | Z = 2 (disjoint) |
| Z' = 2 Z = 1, W = S | Z = 2, W = S | Z = 4 (disjoint) | Z = 4 (disjoint) |
| Z' = 3 Z = 1, W = S | Z = 1, W = S | Z = 4, W = S | Z = 8 (disjoint) |

In Tables 5 and 6, for the entries marked (disjoint), the different SSBs associated with the same PRACH resource are associated with disjoint subsets of preamble indicies. This means that for a particular preamble index in a particular PRACH resource, it is associated with no more than one SSB.

In Tables 5 and 6, for the entries not marked with (disjoint), SSBs associated with the same PRACH resource are to various extent associated with overlapping preamble subsets. For the entries marked W=S, S SSBs that are associated with the same PRACH resource are associated to (partly or fully) overlapping subsets of preamble indices. For the entries marked W=floor(W/x), (with x=2,4 for example), a set of W SSBs that are associated with the same PRACH resource are associated to (partly or fully) overlapping subsets of preamble indices. A second set of S-W SSBs are associated to subsets of preamble indices disjoint to the subsets associated with the the first set of SSBs. However, SSBs in the second set may be associated to overlapping subsets of preamble indices among themselves. For example, if S=4 and W=S/2=2, then two sets of 2 SSBs each are associated with overlapping subsets of preamble indices, but SSBs in different sets are associated with disjoint (non-overlapping) subsets of preamble indices. In various embodiments, the size of those subsets are given by the number of preambles per SSB per PRACH resource (P).

Example Embodiments of S Depending on the Number of Actually Transmitted SSBs (L)

In various embodiments, the value range of the parameter "the number of SSBs per PRACH resource" is fixed in the specification, for example S={1,2,3,4,8,12,16}. In various embodiments, the values of S depend on the number of actually transmitted SSBs, which is separately configured in some embodiments. The number of actually transmitted SSBs is denoted L for brevity. It is beneficial if the number of SSBs associated per PRACH resource is a factor of the total number of actually transmitted SSBs since then the actually transmitted SSBs are associated with an integer number of PRACH resources. In some embodiments, this may allow for the most efficient use of PRACH resources.

An example embodiment of value ranges for S for different L is shown in Table 7.

TABLE 7

| | Values of S: | | | | | | | |
|---|---|---|---|---|---|---|---|---|
| L = 8 | 1 | 2 | 3 | 4 | 5 | 6 | 7 | 8 |
| L = 15 | 1 | 3 | 5 | 6 | 9 | 10 | 12 | 15 |
| ... | | | | | | | | |
| L = 64 | 1 | 2 | 3 | 4 | 8 | 16 | 32 | 64 |

In various embodiments, a subset of the values of S are fixed in the specification, e.g. 1, 4, 8, while other values depend on L. In that case, a table would only list the values that depend on L in some embodiments. An example embodiment is given in Table 8 in which only positive integer S are listed. The values marked with '*' are "reserved values" in some embodiments.

TABLE 8

| | Values of S: | | | | | | | |
|---|---|---|---|---|---|---|---|---|
| L = 1 | 1 | 1* | 1* | 1* | 1* | 1* | 1* | 1* |
| L = 2 | | 2 | 2* | 2* | 2* | 2* | 2* | 2* |
| L = 3 | | 3 | 3* | 3* | 3* | 3* | 3* | 3* |
| L = 4 | | 2 | 4 | 4* | 4* | 4* | 4* | 4* |
| L = 5 | | 5 | 5* | 5* | 5* | 5* | 5* | 5* |
| L = 6 | | 2 | 3 | 6 | 6* | 6* | 6* | 6* |
| L = 7 | | 7 | 7* | 7* | 7* | 7* | 7* | 7* |
| L = 8 | | 2 | 4 | 8 | 8* | 8* | 8* | 8* |
| L = 9 | | 3 | 6 | 9 | 9* | 9* | 9* | 9* |
| L = 10 | | 2 | 4 | 5 | 10 | 10* | 10* | 10* |
| L = 11 | | 11 | 11* | 11* | 11* | 11* | 11* | 11* |
| L = 12 | | 2 | 4 | 6 | 8 | 12 | 12* | 12* |
| L = 13 | | 13 | 13* | 13* | 13* | 13* | 13* | 13* |
| L = 14 | | 2 | 7 | 7* | 7* | 7* | 7* | 7* |
| L = 15 | | 2 | 3 | 5 | 10 | 15 | 15* | 15* |
| L = 16 | | 2 | 4 | 8 | 16 | 16* | 16* | 16* |
| ... | | | | | | | | |
| L = 64 | | 2 | 4 | 8 | 16 | 32 | 64 | 64* |

In various embodiments, a subset of the values of S are defined such that they are the positive integer values such that A*S*F=L*B for some pair of positive integers A and B. In some embodiments, S is limited to be at most L. For example, for F=4 and L=16, S can have the values 1, 2, 4, 8, 16, corresponding to {A,B}={4,1}, {A,B}={2,1}, {A,B}={1,1}, {A,B}={1,2}, {A,B}={1,4}, respectively.

In various embodiments, the values of S, including fractional S=1/N with N being positive integer, depend on L. An example is shown in Table 9.

TABLE 9

| | Values of S: | | | | | | | |
|---|---|---|---|---|---|---|---|---|
| L = 1 | 1 | 1* | 1* | 1* | 1* | ⅛ | ¼ | ½ |
| L = 2 | | 2 | 2* | 2* | 2* | ⅛ | ¼ | |
| L = 3 | | 3 | 3* | 3* | 3* | ⅛ | ¼ | |
| L = 4 | | 2 | 4 | 4* | 4* | ⅛ | ¼ | |
| L = 5 | | 5 | 5* | 5* | 5* | ⅛ | ¼ | |
| L = 6 | | 2 | 3 | 6 | 6* | ⅛ | ¼ | |
| L = 7 | | 7 | 7* | 7* | 7* | ⅛ | ¼ | |
| L = 8 | | 2 | 4 | 8 | 8* | ⅛ | ¼ | |
| L = 9 | | 3 | 6 | 9 | 9* | ⅛ | ¼ | |
| L = 10 | | 2 | 4 | 5 | 10 | ⅛ | ¼ | |
| L = 11 | | 11 | 11* | 11* | 11* | ⅛ | ¼ | |
| L = 12 | | 2 | 4 | 6 | 12 | ⅛ | ¼ | |
| L = 13 | | 13 | 13* | 13* | 13* | ⅛ | ¼ | |
| L = 14 | | 2 | 7 | 7* | 7* | ⅛ | ¼ | |
| L = 15 | | 2 | 3 | 5 | 10 | ⅛ | ¼ | |
| L = 16 | | 2 | 4 | 8 | 16 | ⅛ | ¼ | |
| ... | | | | | | | | |
| L = 64 | | 2 | 4 | 8 | 16 | 32 | 64 | |

In some embodiments, the number of actually transmitted SSBs is a product of two positive integers, i.e. L=C*D, e.g. when the actually transmitted SSBs are indicated using two bitmaps where one bitmap indicates the actually transmitted SSBs in a group (of SSBs) and the second bitmap indicates the transmitted groups, with the assumption that the same number of SSBs is actually transmitted in each transmitted group.

For example, if the each of the two bitmaps is 8 bits, then the number of actually transmitted SSBs (as indicated by the two bitmaps) is each product of C={1,2,3,4,5,6,7,8} and D={1,2,3,4,5,6,7,8}, i.e. the maximum number is 64 SSBs. In many embodiments, the case that C=0, D=0 and/or L=0 is not feasible and can be discarded. In some cases, the actually transmitted SSBs are indicated by a single bitmap, e.g. 4 bits or 8 bits, in which case L={1,2,3,4} or L={1,2,3,4,5,6,7,8}, respectively.

In some embodiments in which L is a product of two positive integers, S is a function of only one of the integers C, for example the integer corresponding to the number of actually transmitted SSBs in a group. In some embodiments in which both the two bitmap case and the single bitmap case are used, e.g. in different ranges of carrier frequency, S is a function of C in the two bitmap case (L is a product of C and D), e.g. in a particular range of carrier frequency, and S is a function of L in the single bitmap case, e.g. in a particular range of carrier frequency.

In some embodiments, the range of C coincides with the range of L, e.g. C={1,2,3,4,5,6,7,8} and L={1,2,3,4,5,6,7,8}. In some embodiments, the range of L is a subset of the range of C and/or L for another frequency range, e.g. C={1,2,3,4,5,6,7,8} and L={1,2,3,4}. In these cases, the same function can be used to get S from C and/or L for different frequency ranges. In various embodiments, the values of S include values that are greater than L or C. In some embodiments, those values can be used when C is used to select S and for the cases that D>1, i.e. L is greater than C. In some embodiments, those values of S can only be used if L>=S. One way to express this is min(L, "S value"). An example is given in Table 10.

TABLE 10

| | | Values of S: | | | | | |
|---|---|---|---|---|---|---|---|
| L or C = 1 | 1 | min (L, 2) | min (L, 4) | min (L,8) | 1/16 | 1/8 | 1/4 | 1/2 |
| L or C = 2 | 2 | | min (L, 4) | min (L, 8) | | | | |
| L or C = 3 | 3 | | min (L, 6) | min (L, 9) | | | | |
| L or C = 4 | 2 | 4 | | min (L, 8) | | | | |
| L or C = 5 | 5 | | min (L, 10) | min (L, 15) | | | | |
| L or C = 6 | 2 | 3 | 6 | | | | | |
| L or C = 7 | 7 | | min (L, 14) | min (L, 21) | | | | |
| L or C = 8 | 2 | 4 | 8 | | | | | |

In various embodiments, in one frequency range, e.g. below 6 GHz, the maximum number of SSBs (e.g. 4 or 8) is equal to or less than the number of values of S, e.g. 8, so the each feasible number of SSBs can be a part of the range of S, e.g. {1,2,3,4,5,6,7,8}.

In various embodiments, for another frequency range, e.g. above 6 GHz, the maximum number of SSBs (e.g. 64) can be larger than the number of values of S, .e.g. so not all feasible number of SSBs can be a part of the range of S. In some such embodiments, the number of actually transmitted SSBs is expressed through two bitmaps, as described above, with L=C*D.

For example, the number of actually transmitted SSBs above 6 GHz (as indicated in RMSI) is an integer multiple of the number of actually transmitted SSBs in a group (C), which for example is indicated by the bitmap in the RRC parameter InOneGroup. The number of actually transmitted SSBs per group can be C={1,2,3,4,5,6,7,8}. It is beneficial if the SSBs per RACH resource is an integer multiple of C since the same set of SSBs will be associated with different RACH resources after wrap around. In some embodiments, where not all feasible number of SSB can be a part of the values of S, the values of S depend on the number of actually transmitted SSBs in a group (C).

TABLE 11

Range of S (e.g. RRC parameter SSB-per-rach-occasion) in a frequency range (e.g. above 6 GHz)

| C (number of actually transmitted SSBs in a group) | Value range of S (e.g. 3-bit SSB-per-rach-occasion) |
|---|---|
| 1 | 1, 2, 3, 4, 5, 6, 7, 8 |
| 2 | 1, 2, 4, 6, 8, 10, 12, 16 |
| 3 | 1, 3, 6, 9, 12, 15, 18, 24 |
| 4 | 1, 2, 4, 8, 12, 16, 24, 32 |
| 5 | 1, 2, 4, 5, 10, 15, 20, 25 |
| 6 | 1, 2, 3, 6, 9, 12, 18, 24 |
| 7 | 1, 2, 3, 4, 7, 14, 21, 28 |
| 8 | 1, 2, 4, 8, 12, 16, 24, 32 |

Example Embodiments of S Depending on F, K and/or L

In various embodiments, the values of S depend on a combination of the parameters F, K and/or L (including C and/or D).

In some embodiments, the values for S for a particular F and L (or C and/or D) are such that each SSB associated with a PRACH resources in the same time instance are associated with the same amount of PRACH resources and/or preamble indices.

In some embodiments, the values for S for a particular F and L (or C and/or D) are such that the number of consecutive PRACH resources that a single SSB can be associated to (no other SSB associated to the same PRACH resources) is limited by F.

In some embodiments, different tables are used for different carrier frequency ranges, e.g. one table below 3 GHz, one table between 3 GHz and 6 GHz and one table equal to or above 6 GHz. These ranges correspond to 4-bit bitmap, 8-bit bitmap and 8 bit+8 bit two bitmaps (with groups), respectively.

In some embodiments, value of S is determined by a combination of C (or L) and F, as exemplified in Table 12. In some embodiments, an S of the form S=1/N (N positive integer) is included in the value range only if F is at least N. In some embodiments, the entry otherwise corresponds to another value on the form S=N or S=min(L,N).

TABLE 12

| | | | Values of S: | | | | |
|---|---|---|---|---|---|---|---|
| L or C = 1 | 1 | min (L, 2) | min (L, 3) | min (L, 4) | min (L, 8) | If F ≥ 8 : 1/8 Else: min (L, 6) | If F ≥ 4: 1/4 Else: min (L, 5) | If F ≥ 2: 1/2 Else: min (L, 7) |
| L or C = 2 | 2 | | min (L, 4) | min (L, 6) | min (L, 8) | If F ≥ 8: 1/8 Else: min (L, 10) | If F ≥ 4: 1/4 Else: min (L, 12) | If F ≥ 2: 1/2 Else: min (L, 14) |
| L or C = 3 | 3 | | min (L, 6) | min (L, 9) | min (L, 12) | If F ≥ 8: 1/8 Else: min (L, 15) | If F ≥ 4: 1/4 Else: min (L, 18) | If F ≥ 2: 1/2 Else: min (L, 21) |

TABLE 12-continued

| | | Values of S: | | | | | |
|---|---|---|---|---|---|---|---|
| L or C = 4 | 2 | 4 | min (L, 8) | min (L, 12) | If F ≥ 8: 1/8 Else: min (L, 16) | If F ≥ 4: 1/4 Else: min (L, 20) | If F ≥ 2: 1/2 Else: min (L, 24) |
| L or C = 5 | 5 | min (L, 10) | min (L, 15) | min (L, 20) | If F ≥ 8: 1/8 Else: min (L, 25) | If F ≥ 4: 1/4 Else: min (L, 30) | If F ≥ 2: 1/2 Else: min (L, 35) |
| L or C = 6 | 2 | 3 | 6 | min (L, 12) | If F ≥ 8: 1/8 Else: min (L, 18) | If F ≥ 4: 1/4 Else: min (L, 24) | If F ≥ 2: 1/2 Else: min (L, 30) |
| L or C = 7 | 7 | min (L, 14) | min (L, 21) | min (L, 28) | If F ≥ 8: 1/8 Else: min (L, 35) | If F ≥ 4: 1/4 Else: min (L, 42) | If F ≥ 2: 1/2 Else: min (L, 49) |
| L or C = 8 | 2 | 4 | 8 | min (L, 16) | If F ≥ 8: 1/8 Else: min (L, 24) | If F ≥ 4: 1/4 Else: min (L, 32) | If F ≥ 2: 1/2 Else: min (L, 40) |

In some embodiments, different tables are used for different carrier frequency ranges, e.g. one table below 3 GHz, one table between 3 GHz and 6 GHz and one table equal to or above 6 GHz. These ranges correspond to 4-bit bitmap, 8-bit bitmap and 8 bit+8 bit two bitmaps (with groups), respectively.

In some embodiments, the table for 3 GHz and/or with 4-bit table has four rows corresponding to different L. In some embodiments, S value range (for below 3 GHz and/or with 4-bit table) does not depend on other parameters, for example S={1, 2, 3, 4, 1/2, 1/4, 1/8, reserved} or S={1, 2, 3, 4, 1/2, 1/4, 1/8, 1/16}.

In some embodiments, the table for 3-6 GHz (and/or single 8-bit bitmap) is different from the table for above or equal to 6 GHz (and/or two 8-bit bitmaps). In some embodiments, the same table is used for both cases, e.g. similarly as in Table 12.

Example Embodiments of the Number of Preambles Per SSB Per PRACH Resource (P) Depending on S In various embodiments, the total number of preambles per PRACH resource is fixed or given by a specification, for example to 64. In some embodiments, it is configurable, e.g. to 64, 128 or 256. It is clear that it is most efficient if the number of preambles per SSB per PRACH resource (P) falls within this number, e.g. up to 64. However, with multiple SSBs associated with the same RACH resource and with the SSBs associated with disjoint subsets of preamble indices, instead the total number of preambles, summed over the SSBs associated with a RACH resource, should fall within this number. For example, if 8 SSBs are associated with disjoint subsets in the same RACH resource, which has totally 64 available preamble indices, then it doesn't make sense to associate the SSBs to subsets of preamble indices with more than 8 indices, since then the subsets couldn't be disjoint. On the other hand, if only a small number of SSBs are associated with a PRACH resource, e.g. 1 SSB, then it should be possible to associate it with a subset of preamble indices that is large, e.g. all available preamble indices in the PRACH resource, e.g. 64. Hence, a more efficient indication of the number of preambles per SSB per PRACH resource (P) can be achieved if the the value range of number of preambles per SSB per PRACH resource (P) depends on the configured number of SSBs per PRACH resource (S). For a small S, larger values of P should be included in the value range of P. For a large S, smaller values of P should be included in the value range of P.

In an example, for S≤4: the value range of P=4*N, with N=1, . . . , 16 and for S>4: the value range of P=4*N, with N=1/4, 1/2, 1, . . . , 14.

In another example, for S≤4: the value range of P=4*N, with N=1, . . . , 16 and for S>4: the value range of P=N, with N=1, . . . , 16.

In yet another example, for S≤4: the value range of P=4*N, with N=1, . . . , 16 and for S≥4: the value range of P=N, with N=1, . . . , 16.

Figure 10:
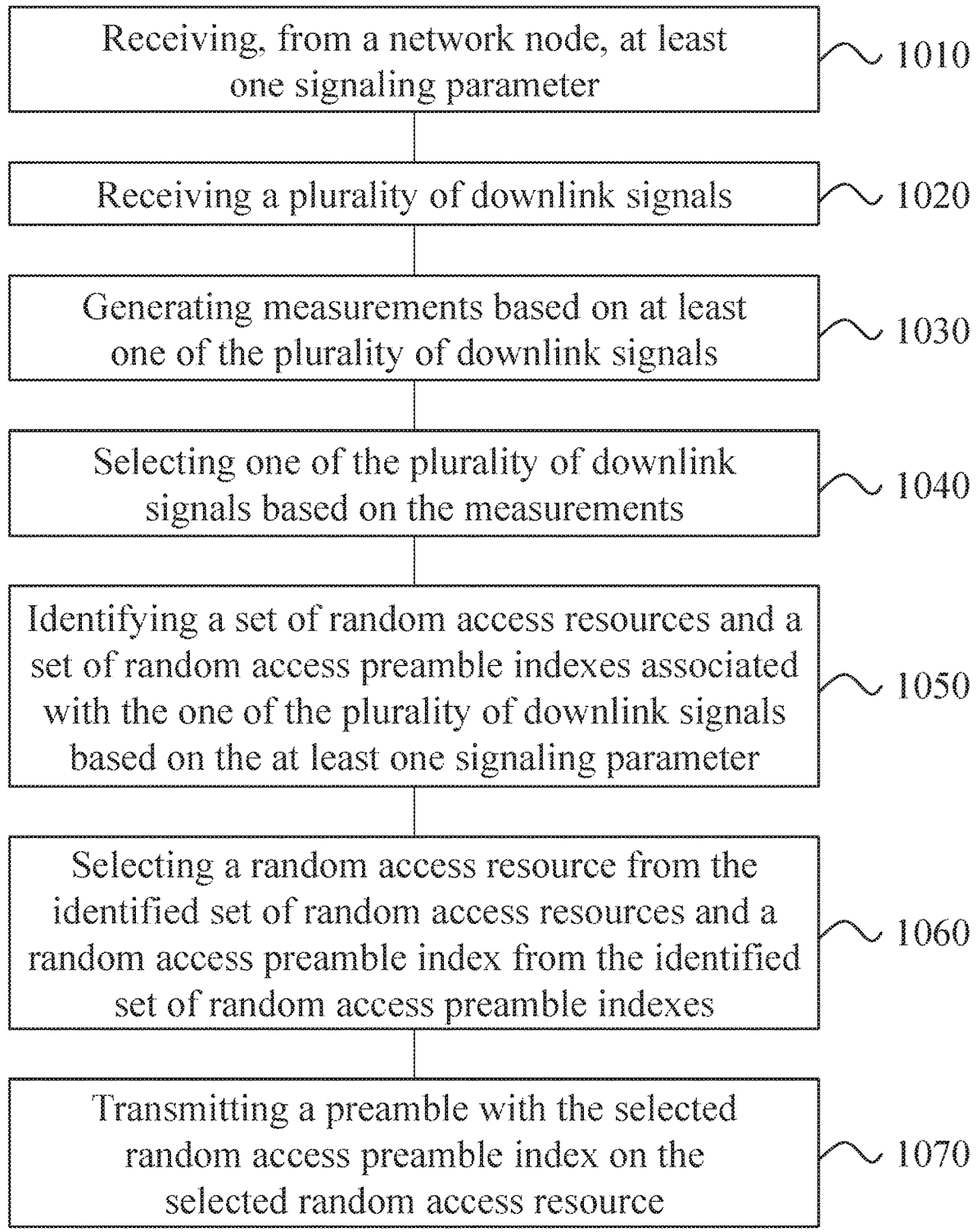
FIG. 10 shows an example of a wireless communication method carried out on a wireless device (or user equipment).

FIG. 10 shows an example of a wireless communication method carried out on a wireless device (or user equipment). The method 1000 includes, at step 1010, receiving, from a network node, at least one signaling parameter. In some embodiments, the at least one signaling parameter is received as part of a random access configuration. In other embodiments, the at least one signaling parameter comprises one or more of a number of frequency multiplexed physical random access channel (PRACH) resources, a number of times a sequence is repeated within a preamble, the number of actually transmitted SSBs, the number of actually transmitted SSBs within a group of SSBs, or a number of consecutive PRACH resources.

The method 1000 includes, at step 1020, receiving a plurality of downlink signals. In some embodiments, the plurality of downlink signals comprises SS/PBCH (synchronization signal/physical broadcast channel) blocks (SSBs), CSI-RS (channel-state information reference signal), or actually transmitted SSBs.

The method 1000 includes, at step 1030, generating measurements based on at least one of the plurality of downlink signals. In some embodiments, the measurements comprise reference signal received power (RSRP).

The method 1000 includes, at step 1040, selecting one of the plurality of downlink signals based on the measurements.

The method 1000 includes, at step 1050, identifying a set of random access resources and a set of random access preamble indexes associated with the one of the plurality of downlink signals based on the at least one signaling parameter. In some embodiments, the set of random access resources is identified from a larger set of random access resources, and wherein the set of random access preamble indexes is identified from a larger set of random access preamble indexes. In other embodiments, the identification of the set of random access resources and the set of random access preamble indexes is performed as described in the context of various embodiments disclosed in this patent document.

The method 1000 includes, at step 1060, selecting a random access resource from the identified set of random access resources and a random access preamble index from the identified set of random access preamble indexes.

The method 1000 includes, at step 1070, transmitting a preamble with the selected random access preamble index on the selected random access resource.

Figure 11:
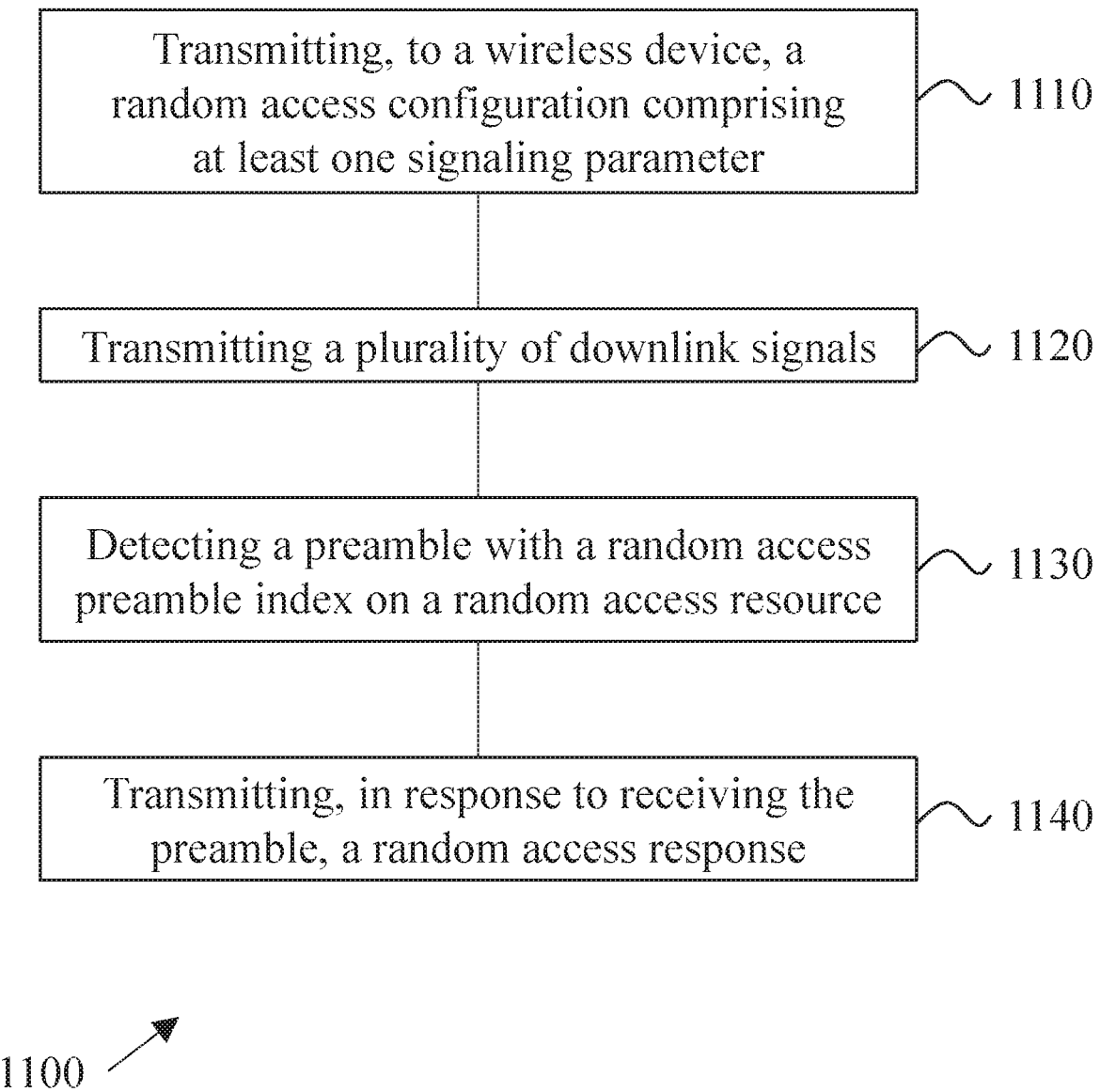
FIG. 11 shows an example of a wireless communication method carried out on a network node (or gNB or base station).

FIG. 11 shows an example of a wireless communication method carried out on a network node (or gNB or base station). This example may include some features and/or steps that are similar to those shown in FIG. 10, and described in this document. At least some of these features and/or components may not be separately described in this section.

The method 1100 includes, at step 1110, transmitting, to a wireless device, a random access configuration comprising at least one signaling parameter. In some embodiments, the at least one signaling parameter comprises a number of frequency multiplexed physical random access channel (PRACH) resources, a number of times a sequence is repeated within a preamble, a number of actually transmitted SSBs, a number of actually transmitted SSBs within a group of SSBs, or a number of consecutive PRACH resources.

The method 1100 includes, at step 1120, transmitting a plurality of downlink signals. In some embodiments, the plurality of downlink signals comprises SS/PBCH (synchronization signal/physical broadcast channel) blocks (SSBs), CSI-RS (channel-state information reference signal), or actually transmitted SSBs.

The method 1100 includes, at step 1130, detecting a preamble with a random access preamble index on a random access resource.

The method 1100 includes, at step 1140, transmitting, in response to receiving the preamble, a random access response. In some embodiments, the random access resource and the random access preamble index are selected from a set of random access resources and a set of random access preamble indexes, respectively, and wherein the selection is associated with one of the plurality of downlink signals based on the at least one signaling parameter.

The method 1100 may further include receiving, in response to transmitting the random access response, a connection request message. The method 1100 may further include transmitting, in response to receiving the connection request message, a contention resolution message to complete a configuration of a random access procedure for subsequent data transmission between the network node and the wireless device.

Another example of a wireless communication method, implemented at a network node, includes receiving, from a network node, an information element indicating a first parameter and a second parameter, selecting a random access resource based on the first parameter, selecting a random access preamble index based on the second parameter, wherein a value of the second parameter does not exceed a maximum value for the second parameter based on a relationship between the first and second parameter, and transmitting a preamble with the selected random access preamble index on the selected random access resource.

Yet another example of a wireless communication method, implemented at a wireless device, includes transmitting, to a wireless device, an information element indicating a first parameter and a second parameter, transmitting a plurality of downlink signals, detecting a preamble with a random access preamble index on a random access resource, and transmitting, in response to receiving the preamble, a random access response, wherein the random access resource and the random access preamble index are selected from a set of random access resources and a set of random access preamble indexes, respectively, wherein the selection is associated with one of the plurality of downlink signals based on the first parameter and the second parameter, and wherein a value of the second parameter does not exceed a maximum value for the second parameter based on a relationship between the first and second parameter.

These methods may further include the first parameter being SSB-per-rach-occasion, and the second parameter being CB-preambles-per-SSB. In an example, the value of the second parameter is in a first range of values when the first parameter is less than a threshold value, and the value of the second parameter is in a second range of values different from the first range of values when the first parameter is greater than or equal to the threshold value. In another example, each value of the first range of values is a multiple of a corresponding value in the second range of values.

Figure 12:
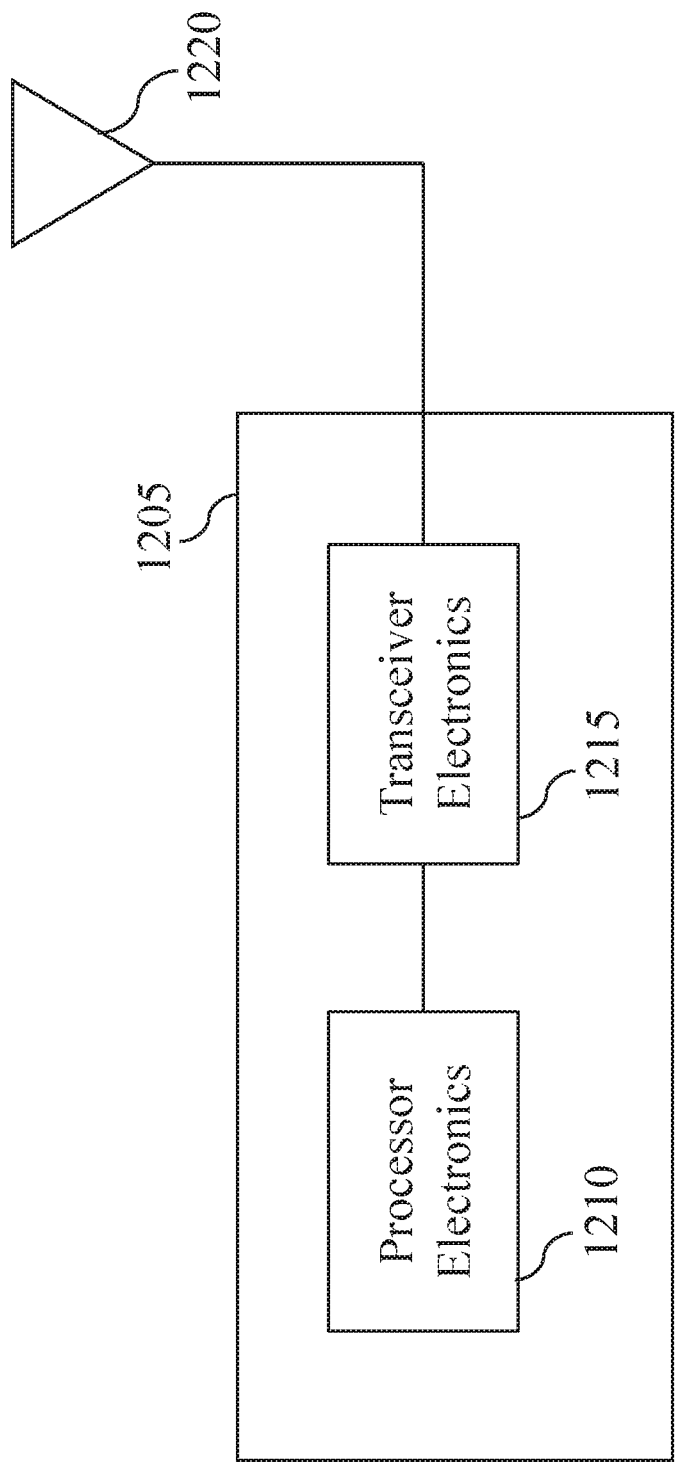
FIG. 12 is a block diagram representation of a portion of an apparatus that may implement a method or technique described in this patent document.

FIG. 12 is a block diagram representation of a portion of a radio station, in accordance with some embodiments of the presently disclosed technology. An apparatus 1205, such as a base station or a wireless device (or UE), can include processor electronics 1210 such as a microprocessor that implements one or more of the techniques presented in this document. The apparatus 1205 can include transceiver electronics 1215 to send and/or receive wireless signals over one or more communication interfaces such as antenna(s) 1220. The apparatus 1205 can include other communication interfaces for transmitting and receiving data. Apparatus 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions are implemented using the apparatus 1205.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
receiving, by a wireless device from a base station, a Radio Resource Control (RRC) signaling including an information element configuring a random access procedure, wherein the information element indicating a number of synchronization signal blocks per random access occasion and a number of preambles per synchronization signal block, and wherein the number of preambles per synchronization signal block summed over the number of synchronization signal blocks per random access occasion is less or equal to 64; and
transmitting a preamble from the wireless device to the base station on a random access resource selected based on the RRC signaling for the random access procedure.

2. The method of claim 1, wherein the number of synchronization signal blocks per random access occasion is denoted as S and the number of preambles per synchronization signal block is denoted as P, and wherein for S<4, P=4×N, N=1, . . . , 16.

3. The method of claim 2, wherein P is configured as a 4-bit parameter and S is configured as a 3-bit parameter.

4. The method of claim 1, wherein the number of synchronization signal blocks per random access occasion is denoted as S and the number of preambles per synchronization signal block is denoted as P, and wherein for S=4, P=N, N=1, . . . , 16.

5. The method of claim 4, wherein P is configured as a 4-bit parameter and S is configured as a 3-bit parameter.

6. A method for wireless communication, comprising:
transmitting, by a base station to a wireless device, a Radio Resource Control (RRC) signaling including an information element configuring a random access procedure, wherein the information element indicating a number of synchronization signal blocks per random access occasion and a number of preambles per synchronization signal block, wherein the number of preambles per synchronization signal block summed over the number of synchronization signal blocks per random access occasion is less or equal to 64; and
receiving a preamble by the base station from the wireless device on a random access resource for the random access procedure in response to the RRC signaling.

7. The method of claim 6, wherein the number of synchronization signal blocks per random access occasion is denoted as S and the number of preambles per synchronization signal block is denoted as P, and wherein for S<4, P=4×N, N=1, . . . , 16.

8. The method of claim 7, wherein P is configured as a 4-bit parameter and S is configured as a 3-bit parameter.

9. The method of claim 6, wherein the number of synchronization signal blocks per random access occasion is denoted as S and the number of preambles per synchronization signal block is denoted as P, and wherein for S=4, P=N, N=1, . . . , 16.

10. The method of claim 9, wherein P is configured as a 4-bit parameter and S is configured as a 3-bit parameter.

11. A wireless communications apparatus comprising:
a processor; and
a memory including processor executable code, wherein the processor executable code upon execution by the processor configures the processor to:
receive, from a base station, a Radio Resource Control (RRC) signaling including an information element configuring a random access procedure, wherein the information element indicating a number of synchronization signal blocks per random access occasion and a number of preambles per synchronization signal block, and wherein the number of preambles per synchronization signal block summed over the number of synchronization signal blocks per random access occasion is less or equal to 64; and
transmit a preamble to the base station on a random access resource selected based on the RRC signaling for the random access procedure.

12. The apparatus of claim 11, wherein the number of synchronization signal blocks per random access occasion is denoted as S and the number of preambles per synchronization signal block is denoted as P, and wherein for S<4, P=4×N, N=1, . . . , 16.

13. The apparatus of claim 12, wherein P is configured as a 4-bit parameter and S is configured as a 3-bit parameter.

14. The apparatus of claim 11, wherein the number of synchronization signal blocks per random access occasion is denoted as S and the number of preambles per synchronization signal block is denoted as P, and wherein for S=4, P=N, N=1, . . . , 16.

15. The apparatus of claim 14, wherein P is configured as a 4-bit parameter and S is configured as a 3-bit parameter.

16. An apparatus for wireless communication, comprising:

a processor; and a memory including processor executable code, wherein the processor executable code upon execution by the processor configures the processor to:

transmit, to a wireless device, a Radio Resource Control (RRC) signaling including an information element configuring a random access procedure, wherein the information element indicating a number of synchronization signal blocks per random access occasion and a number of preambles per synchronization signal block, wherein the number of preambles per synchronization signal block summed over the number of synchronization signal blocks per random access occasion is less or equal to 64; and receive a preamble from the wireless device on a random access resource for the random access procedure in response to the RRC signaling.

17. The apparatus of claim 16, wherein the number of synchronization signal blocks per random access occasion is denoted as S and the number of preambles per synchronization signal block is denoted as P, and wherein for S<4, P=4×N, N=1, . . . , 16.

18. The apparatus of claim 17, wherein P is configured as a 4-bit parameter and S is configured as a 3-bit parameter.

19. The apparatus of claim 16, wherein the number of synchronization signal blocks per random access occasion is denoted as S and the number of preambles per synchronization signal block is denoted as P, and wherein for S=4, P=N, N=1, . . . , 16.

20. The apparatus of claim 19, wherein P is configured as a 4-bit parameter and S is configured as a 3-bit parameter.

* * * * *

UNITED STATES PATENT AND TRADEMARK OFFICE
CERTIFICATE OF CORRECTION

PATENT NO. : 10,849,167 B2
APPLICATION NO. : 16/926675
DATED : November 24, 2020
INVENTOR(S) : Patrick Svedman It is certified that error appears in the above-identified patent and that said Letters Patent is hereby corrected as shown below:

In the Specification

Column 1, Line 29, delete "to meeting" and insert -- in meeting --, therefor.

Column 7, Line 39, delete "vales" and insert -- values --, therefor.

Column 9, Line 47, delete "greater that one." and insert -- greater than one. --, therefor.

Column 10, Line 5, delete "benefit och reduced" and insert -- benefit of reduced --, therefor.

Column 11, Line 18, delete "indicies." and insert -- indices. --, therefor.

Column 11, Line 33, delete "with the the" and insert -- with the --, therefor.

Column 13, Line 51, delete "S, .e.g." and insert -- S, e.g. --, therefor.

Column 15, Line 59, delete "if the the value" and insert -- if the value --, therefor.

Column 16, Line 22, delete "S≤4" and insert -- S<4 --, therefor.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*